July 30, 1968  H. B. WEBER  3,394,662
TRACKING TRUCK
Filed May 24, 1965  2 Sheets-Sheet 1

INVENTOR.
HANS B. WEBER
BY
Henry Hzak
ATTORNEY

July 30, 1968  H. B. WEBER  3,394,662
TRACKING TRUCK
Filed May 24, 1965  2 Sheets-Sheet 2

INVENTOR.
HANS B. WEBER
BY
Henry Kozak
ATTORNEY

United States Patent Office 3,394,662
Patented July 30, 1968

3,394,662
TRACKING TRUCK
Hans B. Weber, Bedford, Ohio, assignor to
Midland-Ross Corporation
Filed May 24, 1965, Ser. No. 458,005
7 Claims. (Cl. 105—165)

ABSTRACT OF THE DISCLOSURE

A two-wheel railway truck of the pedestal-saddle type employing a variable snubbing arrangement disposed between a journal portion of the saddle and a sloping seat portion of each guide column of the pedestal.

---

The primary object of the invention is to provide in a two-wheel railway truck having an incorporated self-steering capability a snubbing mechanism that provides a frictional force proportional to car loading for controlling vertical and lateral movements of the railway car.

Another object is to provide a suspension system having a variable spring rate characteristic. That is to say, the spring travel per unit of load is not uniform throughout the loading range of the suspension system.

Another object is to provide a suspension system for a railway car in which load springs are arranged to achieve less spring travel per unit of load at heavier loads than at light loads.

A further object is to provide a suspension system for a railway car having at least two springs therein which react sequentially relative to each other.

A correlative object to the preceding object is to provide a means which shunts the spring having the lower spring rate at a predetermined deflection to protect it from the effects of maximum deflection.

The above objects and others apparent hereinbelow are fulfilled in a tracking two-wheel railway truck comprising a wheel and axle assembly and two side frame units. The side frame comprises an upper member or pedestal having a body portion that is affixed to the underframe of a railway car and longitudinally spaced hollow guide columns depending therefrom to define a pedestal opening therebetween. Pedestal seats for a load spring suspension system are arranged longitudinally of the truck and outwardly from the guide columns in opposite directions. The suspension system is supported on a journal saddle having forward and aft portions arranged in vertical registry with portions of the pedestal that rests on the suspension system. A variable snubbing arrangement is provided for damping the oscillations of the railway car. The snubbing mechanism comprises a friction wedge that is spring biased upwardly from the saddle into the hollow guide column for engagement with a journal portion of the saddle and a sloping seat portion of the pedestal.

In the drawings, with respect to which the invention is described below:

Figures 1, 2, 3, 4:
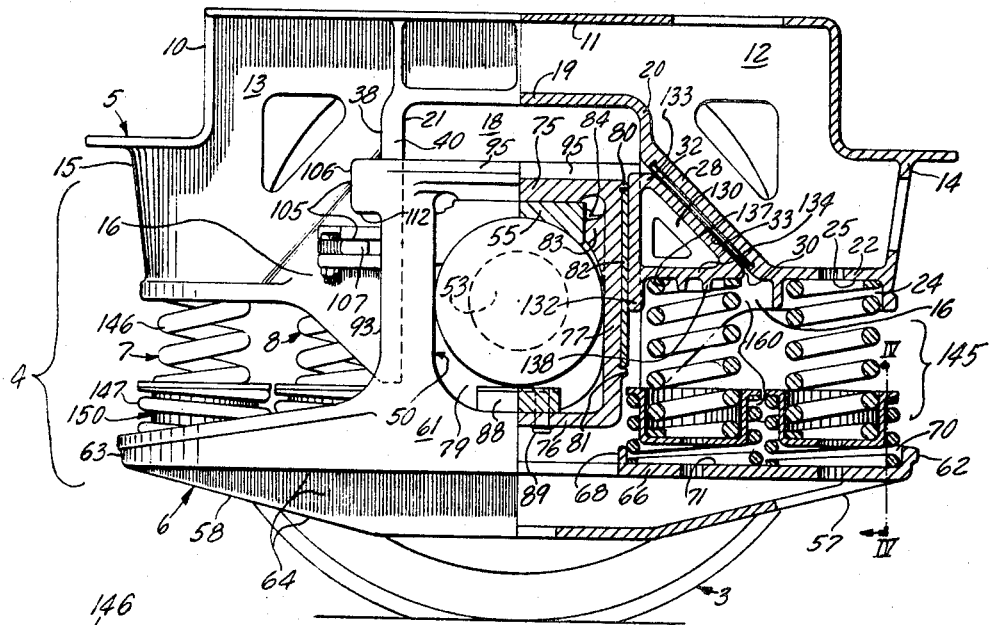
FIG. 1 is a fragmentary side elevation of the two-wheel railway truck in accordance with the invention as mounted on a railway car.
FIG. 2 is a fragmentary end elevation of the truck illustrated in FIG. 1.
FIG. 3 is an enlarged elevation, part in section, of the truck shown in FIG. 1.
FIG. 4 is a fragmentary elevation in vertical transverse section taken along line IV—IV of the truck shown in FIG. 3.
Figure 5:
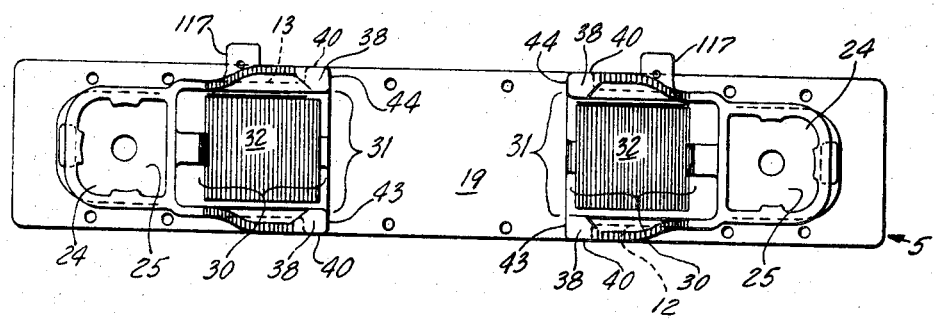
FIG. 5 is a fragmentary view in transverse section, with certain parts deleted, taken along line V—V of the truck shown in FIG. 1.

Referring now to the drawings, there is shown in FIGS. 1, 2, and 3 a portion of a two-wheel railway truck 1 secured, as by a plurality of nut and bolt assemblies, to a fabricated car underframe 2. The railway truck 1 comprises a wheel and axle assembly 3 and two side frame units 4. The side frame unit 4 in general comprises a pedestal frame 5, a saddle 6, load suspension support spring means 7 and a pair of friction units 8.

Pedestal frame

The pedestal frame 5 is of U-shaped construction and has a body portion 10 having a top wall 11 engaging the car underframe, inboard and outboard side walls 12 and 13, respectively, and interconnecting end walls 14 and 15. The frame has a pair of vertically parallel hollow guide columns 16, 16 depending therefrom in horizontally spaced relationship and defining therebetween a pedestal opening 18. The upper portion of the pedestal opening is defined by a top wall 19 and oppositely facing vertical walls 20 and 21.

Extending longitudinally inwardly from each end wall 14, 15, in a horizontal plane, the frame is provided with two bottom walls 22, 22. Each bottom wall connects with the side walls 12 and 13 to define therewith a pair of pockets 24, 24 having downwardly facing surfaces 25, 25. Approximately midway between each end wall and the pedestal opening, and oblique to the plane of each bottom wall 22, 22, there is provided an inclined wall 28, 28 that extends upwardly and inwardly toward the pedestal opening 18. Each inclined wall merges with the vertical wall 20, 21 to define within each guide column 16, 16 a wedge pocket 30, 30 having a rectangular-shaped opening 31, 31 connecting the pocket 30 and pedestal opening 18. Disposed within each pocket on the inclined wall 28, 28 is a wear plate 32 having a downwardly facing friction wedge seat 33 for wedging engagement with the friction unit 8.

Each guide column 16, 16, adjacent to the pedestal opening 18, has a pair of vertically extending ribs 38, 38 disposed on the outwardly facing surfaces of the inboard side wall 12 and outboard side wall 13. Each rib 38 has a vertical wear surface 40 for engagement with spaced opposed surfaces on the saddle 6 hereinafter disclosed. Contiguous with the opposed surfaces of the vertical walls 20 and 21, and in coplanar relation therewith, each guide column 16, 16 is provided with a pair of vertical guide surfaces 43, 44. Surfaces 43, 44 partially define the perimeter of the pedestal opening 18 hereabove mentioned.

Journal saddle

The saddle 6 comprises a journal housing 50 which is receivable in guided longitudinal spaced relation in the hereinabove mentioned pedestal opening 18. Cooperating with the housing 50 is one end of the wheel and axle assembly 3. The end of the axle journal 53 is preferably received in an antifriction roller bearing unit 54. The roller bearing unit 54 cooperates with a journal bearing adapter 55 within the journal housing 50.

Extending longitudinally outwardly from the bottom of the housing 50, and disposed in opposite coplanar directions, are fore and aft portions or arms 57 and 58 respectively. Arms 57 and 58 have a connecting inboard side wall 60 and an outboard side wall 61. Each arm has an end wall 62 and 63. The overall length of the saddle 6 corresponds substantially to that of the pedestal frame 5.

A multifaced bottom wall 64 structually connects the side walls 60 and 61 and forms, in a horizontal plane, two intermediate walls 66, 66. Each intermediate wall terminates inwardly with an upwardly projecting flange 68 to form an elongated pocket 70, 70 having upwardly facing surfaces 71, 71.

The upwardly extending journal housing 50 comprises a top wall 75, a bottom wall 76 and spaced apart vertically extending walls 77 and 78 to define an open region 79 that extends crosswise of the saddle. The region 79 receives the adapter 55 and the journal bearing assembly hereinabove mentioned. Situated on the longitudinally outwardly facing surfaces of the walls 77 and 78 is a pair of vertically spaced wear plate retaining lugs 80, 81. Positioned between each pair of lugs 80, 81 are friction plates 82 which are attached, as by welding, to the walls. Within region 79, in close proximity to the top wall 75, there is disposed on each wall 77, 78 an adapter retaining lug 83, 83. Lugs 83, 83 project into complementary receiving recesses 84, 84 of the adapter 55 and maintain the adapter laterally within the region 79 after the component parts of the wheel and axle assembly are positioned within the journal housing. A bearing retaining block 88 is secured, as with bolts 89, to the bottom wall 76. The bearing block 88 maintains the wheel and axle assembly 3 in the position shown in FIG. 3 so as to prevent the dislocation of the bearing adapter and wheel and axle assembly from the saddle 6. In this assembled position the longitudinal clearance provided between the housing 50 and frame 5 permits longitudinal and angular motion capability of the axle and saddle assembly relative to the frame during curve negotiation.

Figure 6:
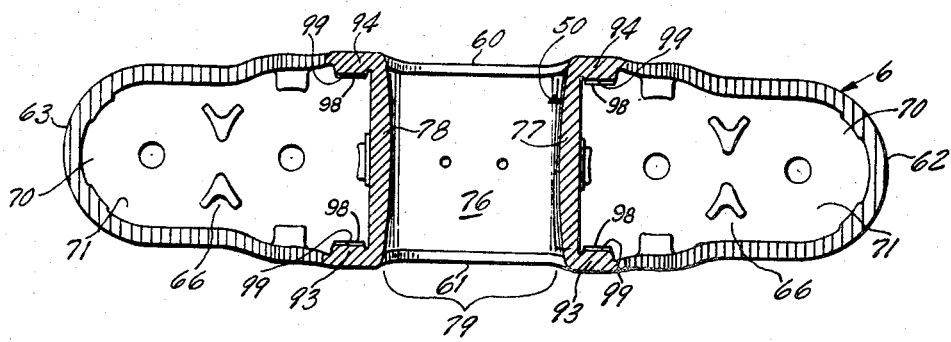
FIG. 6 is a fragmentary plan view in transverse section, with certain parts deleted, taken along line VI—VI of the truck shown in FIG. 1.
Figure 7:
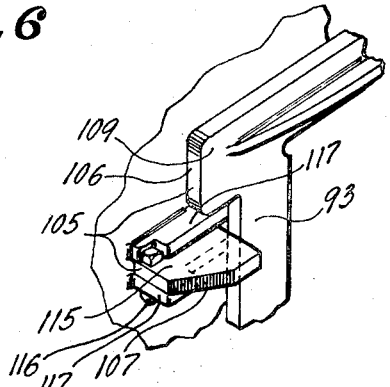
FIG. 7 is an enlarged fragmentary perspective view of the pedestal frame and journal housing interlocking means shown in FIG. 1.

Referring to FIG. 6 it will be seen that the journal housing 50 has formed thereon a pair of laterally spaced, vertically-extending guide flanges 93 and 94. The flanges project in opposite longitudinal directions from the edges of the journal housing walls 77, 78 to embrace the adjacent and related column 16. The flanges positively limit the relative movement between the saddle 6 and pedestal frame 5 transversely of the frame. Each flange merges at its lower end with the side wall 60 or 61. Each pair of guide flanges 93, 94 has spaced opposed bifacial planar surfaces 98, 99 that cooperate in guiding relation with the overlapped vertical wear surfaces 40. Such structure and cooperating relation permits extended lateral motion of the axle assembly relative to the pedestal as defined in applicant's patent application Ser. No. 306,006, filed Sept. 3, 1963, now U.S. Letters Patent No. 3,286,653, entitled "Tracking Truck." In the plane of the flanges 93, 94 and extending vertically upwardly from the top wall 75, there is disposed a pair of laterally spaced reinforcement flanges 95, 95.

To prevent the vertical separation of the saddle 6 from the pedestal frame 5, the side frame unit 4 is provided with a plurality of interlocking means 105. Each interlocking means 105 comprises a stop means 106 disposed on the saddle 6 and a keeper means 107 disposed on the frame 5 in spaced underlapping relation to the stop means 106. Each stop means 106 comprises a rib 109 that extends longitudinally outwardly from the edge of each outboard guide flange 93, 93 adjacent to its upper end. Each rib 109 defines a downwardly facing surface 112 for engagement with the cooperating keeper means 107. Each keeper means 107 comprises an interlocking plate 115 which is removably connected by a nut and bolt assembly 116 to a pair of spaced lugs 117 disposed on the outboard side wall 13 of the frame 5. The plate 115, in its assembled position, has one edge in close proximity to the outboard side wall to prevent the plate from rotating about the nut and bolt assembly.

As mentioned hereinabove, each hollow guide column 16, 16 is provided with a wedge pocket 30, 30 for accommodating a friction wedge 130. Each wedge 130 has a flat vertical wall 132 for engagement with the friction plate 82 disposed at the side of the journal housing 50 and an inclined wall 133 for engagement with the wear plate 32 disposed on the sloping wall of the pocket 30. The surface of the inclined wall 133 is preferably crowned or curved. A horizontal wall 134, normal to the vertical wall 132, connects the diverging walls 132 and 133. Wall 134 has a downwardly facing surface that defines a spring seat 137. Depending from the seat 137 is a spring alignment boss 138. The wedge, in its normal operating condition, is disposed in the pocket 30 with its wall 134 in coplanar relation with the frame's bottom wall 24. The wedge is urged into engagement with the friction plate 82 to thereby dampen the vertical, longitudinal and lateral movements of the frame 5 relative to the saddle 6.

The invention further comprises an improved load spring suspension system. As mentioned hereinabove, the pedestal frame 5 and saddle 6 are each provided with a pair of pockets 24, 24 and 70, 70. In the assembled position of the side frame unit 4, the pockets are in vertical registry to each other with the downwardly and upwardly facing surfaces 25, 25 and 71, 71, respectively, serving as upper and lower spring support seats for the suspension system.

Shown in FIGS. 3 and 4 is a pair of load support spring units 145 arranged in longitudinally spaced relation to each other and disposed between the respective pockets of the saddle and frame. Each unit 145 comprises a pair of helical coil compression springs 146 and 147 concentrically arranged to each other and each having a free height less than the distance between the spring support seats under an empty car condition. The lower spring 147 of each unit 145 rests upon the lower spring seat 71 and extends upwardly therefrom a predetermined distance. As illustrated in FIG. 4, a load transferring means 150 is disposed on the free end of the lower spring 147. The load transferring means supports the upper spring 146 and maintains the upper spring's lower end in spaced relation to the saddle 6 under an empty car condition while the spring's upper end bears against the upper spring seat 25.

The load transferring means 150 is a cup-shaped member having a circular base 152 with a cylindrical side wall 153 extending upwardly therefrom a predetermined height. Disposed on the free end of the side wall is an annular flange 154 that extends laterally outwardly therefrom to define a downwardly facing annular surface 155. The cylindrical wall 153 has an outer diameter less than the inside coil diameter of the lower spring 147 so that the cup-shaped member may be arranged in telescopic relation within the lower spring 147. Annular surface 155 rests upon the free end of spring 147 to support the cup-shaped member therein. The upper spring 146 has an outside coil diameter less than the inside diameter of the cup-shaped member. This relationship allows the lower end of the spring 146 to be positioned within the cup-shaped member to thereby permit the base 152 to serve as a spring seat.

It will be noted that the bar diameter, free space between coils, and static load height for each spring 146 and 147 is different. Thus each spring has a different free height, solid height, solid load (spring capacity) and stress rate. Accordingly each spring reacts, relative to each other, at a different load rate (load per unit of deflection) or different deflection per unit of load.

In the embodiment shown in FIG. 3, the outer-lower spring 147 is shorter and substantially more flexible than the inner-upper spring 146. Thus, the deflection of the inner spring, as compared to the outer spring, is substantially less under light car load weights; that is, the inner spring substantially maintains its static load height during the deflection of the outer spring. Such an arrangement provides a two-stage load spring assembly having a variable spring rate characteristic with the lower spring rate working for the first portion of the overall spring curve and the stiffer spring working for the remaining portion of the overall available spring deflection. Thus, the lower spring 147 provides the required soft riding characteristic under light car load conditions while the upper spring 146 provides sufficient capacity for fully loaded car conditions. Graphically, this may be represented by a spring rate curve consisting of at least two intersecting straight lines.

In order to prevent the overstressing of the lower-outer spring 147, which could lead to permanent set and/or early fatigue failure under heavy car load conditions, the load transferring means 150 is designed to provide overload protection. To accomplish this result, the height of the cylindrical side wall 153 is maintained at a dimension greater than the solid height of the lower spring 147. Thus, as the car load weight increases and the travel of the spring 147 approaches its maximum, the load transferring means 150 bottoms against the lower seat 71 so as to prevent the further deflection of the lower spring 147. When the load transferring means 150 bottoms, it shunts the outer-lower spring and directly transfers to the upper-inner spring 146 the additional increased car load weight. Since spring 146 has a higher load rate than spring 147, the amount of deflection per pound will be smaller. If greater load carrying capacity is needed, additional springs of smaller outer coil diameter may be concentrically arranged within the upper spring 146. If necessary, the springs within each spring unit 145 may be replaced with springs of different bar diameters, outside coil diameters, and free heights.

From the above then, greater car load weights may be sustained by the side frame unit 4 within the overall travel limits of the suspension system 7 when each spring 146, 147, in each unit 145, is designed to react sequentially relative to each other under different load weights.

To obtain the correct amount of damping required:

(1) For the control of all resonance conditions for all possible modes of car oscillation (vertical, lateral, pitch, roll, and nosing);

(2) To avoid over or under damping for either empty or load car conditions; and (3) To keep maximum deflection amplitudes within the travel limits of the suspension system 7; the amount of snubbing must be adjusted for the differences in *extreme* load variations. To accomplish this result, while at the same time increasing the total amount of pay load that the railway car may carry, a spring unit 160 of similar construction to unit 145 is employed to urge the friction wedge towards the journal housing 50.

Such construction provides:

(a) An additional load suspension system which supports approximately one-half of the load weight, and (b) Automatic adjustment in the amount of damping necessary to produce soft and controlled riding characteristics for empty and loaded cars travelling over track having rather large periodic disturbances such as track twist. That is, the damping force is directly dependent on the two-stage load spring arrangement which makes it automatically a two-stage damping arrangement governed by the action of the load springs.

The railway truck described hereinabove may be converted readily into a variable snubbing lightweight car truck. That is, a truck used on railway cars designed for light loads having a comparatively small weight ratio of empty to loaded car. This is accomplished by merely replacing the spring units 145 with helical coil compression springs and the units 160 with single helical coil compression springs of smaller coil diameter or conical springs.

The snubbing mechanism in such a truck provides a progressively increasing frictional force as the load weight increases.

The terms and expressions which have been employed are used as terms of description and not of limitation and there is no intention of excluding such equivalents of the invention described or of the portions thereof that fall within the scope of the claims.

What is claimed is:

1. In a tracking two-wheel railway truck comprising:
   (A) a pedestal frame having a body portion and vertically-parallel guide columns depending therefrom in horizontal spaced relationship to define a pedestal opening therebetween, a downwardly facing friction wedge seat disposed in each of said columns, each seat sloping downwardly and away from the pedestal opening, and at least a pair of downwardly facing pedestal spring seats disposed on said body portion, each pedestal spring seat extending longitudinally outwardly, in opposite directions, from said columns;
   (B) a journal saddle having a base and a journal housing extending upwardly therefrom into said pedestal opening in vertical guide relation with said columns for receiving the journal end of a wheel and axle assembly along a horizontal journal axis of fixed relation with said housing, said pedestal opening receiving said housing with longitudinal clearance sufficient in the lengthwise direction of the pedestal frame to permit substantial angular motion capability of the axle and saddle assembly relative to the frame during curve negotiation;
   (C) a pair of friction wedges, each wedge in engaging relation with one of said wedge seats and said housing, and having a downwardly facing wedge spring seat;
   (D) said journal saddle having a plurality of rigidly fixed, upwardly facing, saddle spring seats disposed below the horizontal plane containing said journal axis, each of said last named seats being in vertical registry with one of said downwardly facing spring seats; and
   (E) separate resilient means disposed between each pair of said seats in vertical registry.

2. The railway truck of claim 1 wherein:
   (A) said wedge spring seats and said pedestal spring seats are contained in a common horizontal plane positioned above the horizontal plane containing said journal axis.

3. The railway truck of claim 1 wherein:
   (A) each of said resilient means comprises at least two compression springs disposed in series relationship that react along a common axis, one within the other, said outer spring being shorter and more flexible than said inner spring; and
   (B) load transferring means interposed between said outer spring and said inner spring in spaced relation to said spring seats, said transferring means supporting said inner spring in telescopic relation to said outer spring and comprising overload protection means, said latter means being adapted to engage said saddle spring seat to limit further compression of said outer spring.

4. The railway truck of claim 1 wherein:
   (A) each of said resilient means have substantially the same load per unit of deflection.

5. The railway truck of claim 1 and interlocking means restricting the vertical separation of said pedestal frame and said saddle and comprising:
   (A) stop means disposed on said journal housing in laterally offset spaced relation to each of said columns; and
   (B) keeper means removably connected to said columns in spaced underlapping relation to said stop means.

6. The railway truck of claim 1 wherein:
(A) each of said resilient means has substantially the same amount of movement between its free height and solid height.

7. The railway truck of claim 1 wherein:
(A) said resilient means disposed between said wedge and saddle spring seats comprises at least two compression springs disposed in series relationship that react sequentially relative to each other along a common axis with each of said springs having a different deflection per unit of load, and at least one of said springs having a predetermined amount of axial movement less than the difference between its free spring height and solid spring height.

References Cited
UNITED STATES PATENTS

| | | | |
|---|---|---|---|
| 655,738 | 8/1900 | Robinson | 267—4 |
| 1,810,876 | 6/1931 | Carry et al. | 105—222 |
| 2,029,749 | 2/1936 | Webb | 105—223 |
| 2,539,607 | 1/1951 | Blattner et al. | 105—224 |
| 2,921,540 | 1/1960 | Williams | 105—224 |
| 2,963,987 | 12/1960 | Cottrell | 105—224 |

ARTHUR L. LA POINT, *Primary Examiner.*

H. BELTRAN, *Assistant Examiner.*